No. 873,860.

PATENTED DEC. 17, 1907.

H. F. HOLMES.
PHONOGRAPH.
APPLICATION FILED JULY 7, 1905.

Witnesses:
W. C. Lunsford
Arthur W. Knupp

Inventor:
Horace F. Holmes.
by Crosby Gregory
atty's

UNITED STATES PATENT OFFICE.

HORACE F. HOLMES, OF CONCORD, NEW HAMPSHIRE.

PHONOGRAPH.

No. 873,860.  Specification of Letters Patent.  Patented Dec. 17, 1907.

Application filed July 7, 1905. Serial No. 268,673.

*To all whom it may concern:*

Be it known that I, HORACE F. HOLMES, a citizen of the United States, residing at Concord, in the county of Merrimack and State of New Hampshire, have invented an Improvement in Phonographs, of which the following description, in connection with the accompanying drawing, is a specification, like letters on the drawings representing like parts.

This invention relates to phonographs, and especially to the manner of connecting the diaphragm to the reproducer or recorder lever, the object of the invention being to provide a novel connection between these parts which results in increased smoothness and distinctness in the sound produced.

The novel features of my invention will be more fully hereinafter described and then pointed out in the claims.

Figure 1:
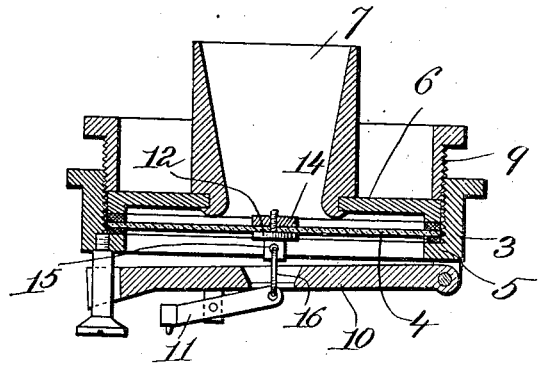
Figure 2:
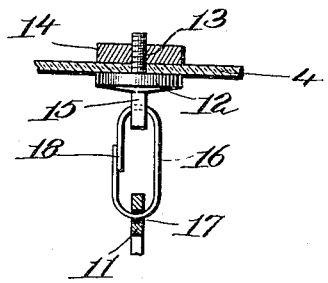

Figure 1 is a central section through a reproducer embodying my invention; Fig. 2 is a section on an enlarged scale on the line x—x Fig. 1.

3 designates the usual cylindrical frame of the reproducer which supports the diaphragm 4, said frame having the inturned flange 5 on which the diaphragm rests. The diaphragm is held in place by the mouthpiece supporting-plate 6 which carries the usual mouth-piece 7, said plate being retained in position by the usual screw-threaded sleeve 9.

10 designates the usual weighted clapper pivoted to the frame 3, and to which is pivoted the reproducer lever 11.

The parts thus far described are such as are usually found in reproducers and form no part of my present invention, which relates solely to the manner of connecting the reproducer lever to the diaphragm.

Instead of cementing a head or attaching member to the diaphragm, as is commonly done, I provide such a head or member 12 with a screw-threaded stem 13 which projects through the diaphragm 4, and on the upper end of which is secured a clamping-nut 14. This attaching-plate 12 has a perforated stem 15 depending therefrom to which is secured a closed link 16, said link passing through an eye or aperture 17 in the end of the reproducer lever.

I have found from my experiments with a construction such as above described that where a closed link or loop 16 is used to connect the reproducer lever to the diaphragm instead of the open link or hook member commonly used, the sound produced has a much smoother quality and is more distinct.

I have found that by securing the attaching member 12 to the diaphragm, as herein shown, a better result is attained than when the head 11 is securely cemented to the underside of the diaphragm.

The closed link 16 may be made in a variety of ways, but preferably it is made by bending a wire into loop-shape and fastening the ends thereof together, as at 18. It is not essential to my invention that these ends should be fastened together, as if the proper material is used the ends will stay in contact with each other when the loop is bent to shape without any securing means, the important thing however is the closed loop as distinguished from an open loop.

Having described my invention what I claim as new and desire to secure by Letters Patent is:—

1. In a phonograph, the combination with a frame, of a diaphragm within the frame, means to clamp the diaphragm at its periphery to the frame, a weighted clapper pivoted to the frame, a reproducer lever pivoted to the clapper, an attaching plate 12 on the under side of the diaphragm, said attaching plate having a screw-threaded stem extending through the diaphragm and a perforated stem 15, a nut on the screw-threaded stem for clamping the attaching plate to the diaphragm, and a closed loop 16 connecting the reproducer lever and the perforated stem 15, said loop being made from a single piece of wire bent to the proper shape and having its ends secured together.

2. In a phonograph, a diaphragm, means to support the same, a pivoted reproducing lever, an attaching member on the underside of the diaphragm, said attaching member having a screw-threaded stem extending through the diaphragm, a clamping-nut on said stem above the diaphragm, and a closed loop connecting said attaching member to the reproducer-lever said loop being made from a single piece of wire bent to the proper shape and having its ends overlapping and secured together.

In testimony whereof, I have signed my name to this specification, in the presence of two subscribing witnesses.

HORACE F. HOLMES.

Witnesses:
SIDNEY S. UPHAM,
ALBERT H. DALRYMPLE.